United States Patent

McGinnis

[15] 3,701,411
[45] Oct. 31, 1972

[54] CONVEYOR SYSTEM
[72] Inventor: Herbert E. McGinnis, Akron, Ohio
[73] Assignee: The B.F. Goodrich Company, New York, N.Y.
[22] Filed: Feb. 1, 1971
[21] Appl. No.: 111,320

[52] U.S. Cl. .................................................198/109
[51] Int. Cl. ...............................................B65g 41/00
[58] Field of Search..........198/108, 109, 233, 92, 192, 198/201; 299/57, 64

[56] References Cited

UNITED STATES PATENTS

| | | | |
|---|---|---|---|
| 2,966,984 | 1/1961 | Moon | 198/109 |
| 2,776,040 | 1/1957 | Snyder | 198/92 |
| 2,109,923 | 3/1938 | Lemmon | 198/192 R |
| 1,773,621 | 8/1930 | Hopkinson | 198/201 X |
| 2,543,368 | 2/1951 | Jones et al. | 198/109 |

Primary Examiner—Evon C. Blunk
Assistant Examiner—Douglas D. Watts
Attorney—W. A. Shira, Jr. and Joseph Januszkiewicz

[57] ABSTRACT

A mobile conveyor system for carrying bulk material in both a straight and transversely curved path having an endless elastomeric belt formed with an embedded inextensible central spine and the margins on either side corrugated for permitting transverse flexing. A self-propelled tractor is pivotally connected at each end of a chain of pivotally interconnected single-axle carriages with the load carrying and return spans of the conveyor belt trained over pulleys provided on the tractors and on rollers on the carriages intermediate the tractors.

8 Claims, 8 Drawing Figures

INVENTOR.
HEBERT E. McGINNIS

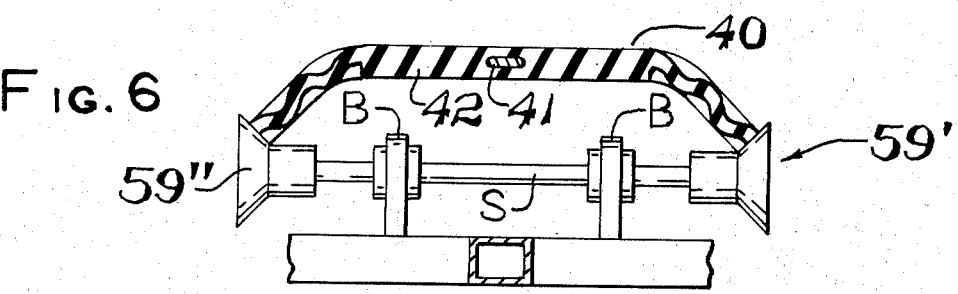
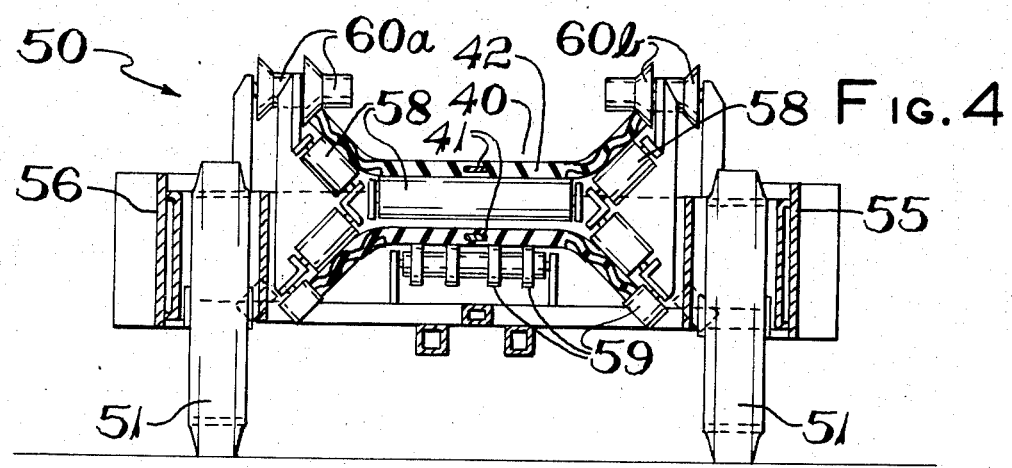
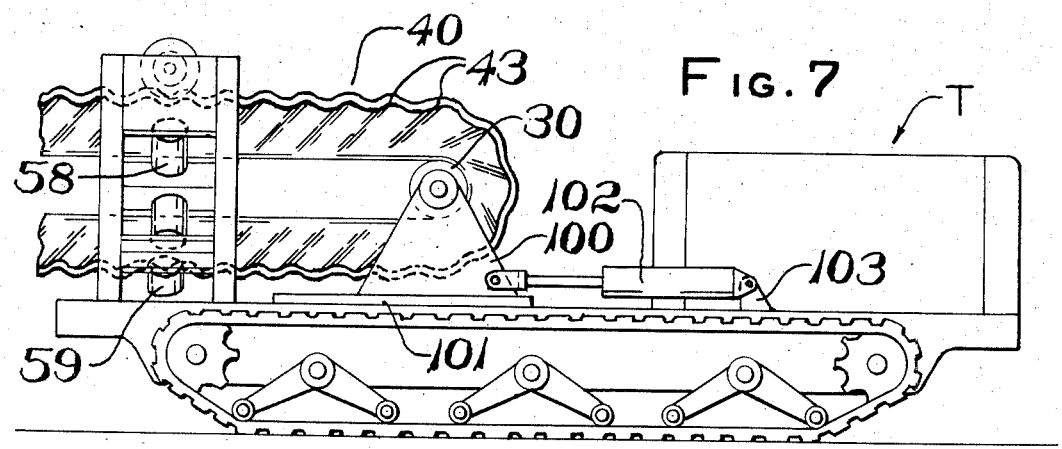
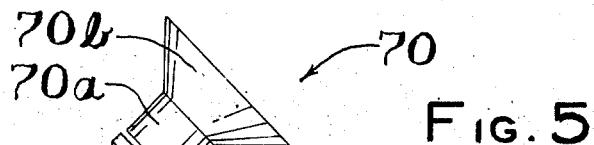

CONVEYOR SYSTEM

BACKGROUND OF THE INVENTION

Heretofore, belt conveyors have been operated in generally straight paths without transverse curvature, or in those applications requiring the belt to follow a curved path, the curvature has been limited to large radii so that a pronounced difference in direction has required a curve extending over a very great distance. In those applications where short changes of direction have been required, as for example in mine galleries, it has been necessary to transfer the load from one straight conveyor to another or else to use a type other than a belt conveyor such as an apron conveyor or a flight conveyor operating in a curved rigid or articulated frame. These latter expedients have been found generally expensive, inefficient and troublesome to operate.

For mining operations in which it is required to continuously transport the discharge from an automatic miner, it has been quite difficult to provide trackless conveyors which can follow the miner through the mine galleries. As the miner moves and changes the direction of its forward movement, it is usually necessary to reposition the sections of conveyor adjacent the miner in order to provide continuous transport of the material discharged from the miner to a remote conveyor station or other centrally located material removal means. Thus, it has long been desirable to provide a trackless conveyor system of the type utilizing an endless belt which has the capability of following an automatic miner through its progression and changes in direction while the system continuously accepts and transports the material discharged from the miner.

SUMMARY OF THE PRESENT INVENTION

The present invention provides a solution to the above-described problem by using an endless elastomeric belt formed with an inextensible central region and corrugated flexible margins extending from either side of the central region which enable the belt to follow a curved path. A tractor means is provided, capable of independently traversing the surface over which bulk material is to be transported, and is attached pivotally to a train of pivotally interconnected single axle carriages. The belt is trained over a pulley provided on the tractor means and the load carrying and return spans of the belt intermediate the tractors are supported and guided during transverse curving of the carriage train by rollers on each of the carriages. The single axle of each carriage is centrally located on the carriage thus permitting the train of carriages and the belts supported thereon to track behind the tractor means as the latter advances along a transversely curved path. Power means is provided on the tractor means for continuously driving the belt over the pulleys.

Thus, a mobile self-powered flexible conveyor system is provided which is capable of continuously transporting bulk material in a transversely curved path and following the source of the bulk material, as for example a mobilized automatic mining machine. The present system thus eliminates the need for relocating separate stationary sections of conveyor apparatus for providing a continuous path of material transport from the mining machine to a remote dispatching station.

BRIEF DESCRIPTION OF THE DRAWINGS

FIG. 1a is an enlarged fragmentary side view of the head tractor H;

FIG. 4 is a section view taken along section indicating lines 4—4 of FIG. 2;

FIG. 5 is an enlarged view of a portion of a carriage roller taken from a view similar to FIG. 4 and showing an alternative arrangement for the idler rollers;

FIG. 6 is an enlarged portion of a view similar to FIG. 4 and illustrates an alternate form of the rollers for retaining the return span of the belt;

FIG. 7 is an enlarged portion of a side elevation view of the tail-end tractor taken along lines 6—6 of FIG. 1.

DETAILED DESCRIPTION

Figure 1:
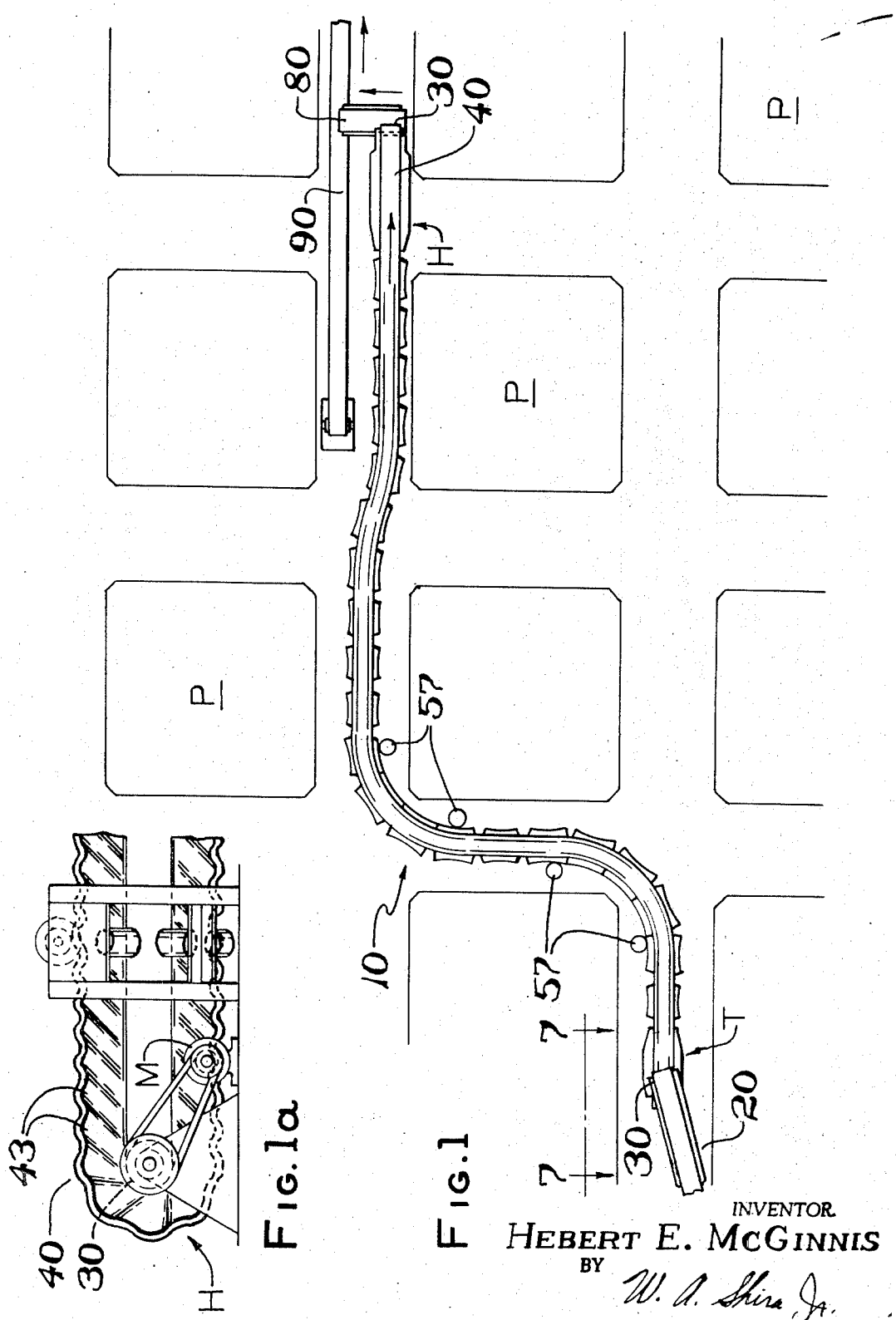
FIG. 1 is a plan view of the entire conveyor system as it appears in operation in the galleries of a typical mine.

Referring now to FIG. 1, the conveyor system 10 is shown disposed in a serpentine fashion as it follows an automatic miner 20 removing material from the galleries of a mine. The conveyor is curved transversely as it bends around the corners of the mine walls or pillars P. The presently preferred form of the conveyor system has each end thereof provided with a self-propelled tractor, denoted, respectively, by letter H for the tractor at the discharge or head end of the conveyor and T for the tractor at the receiving or tail end of the conveyor. Each of the tractors has a pulley means, preferably a drum 30 provided thereon, over which a conveyor belt 40 is received in a manner so as to travel in an endless path.

Figure 2:
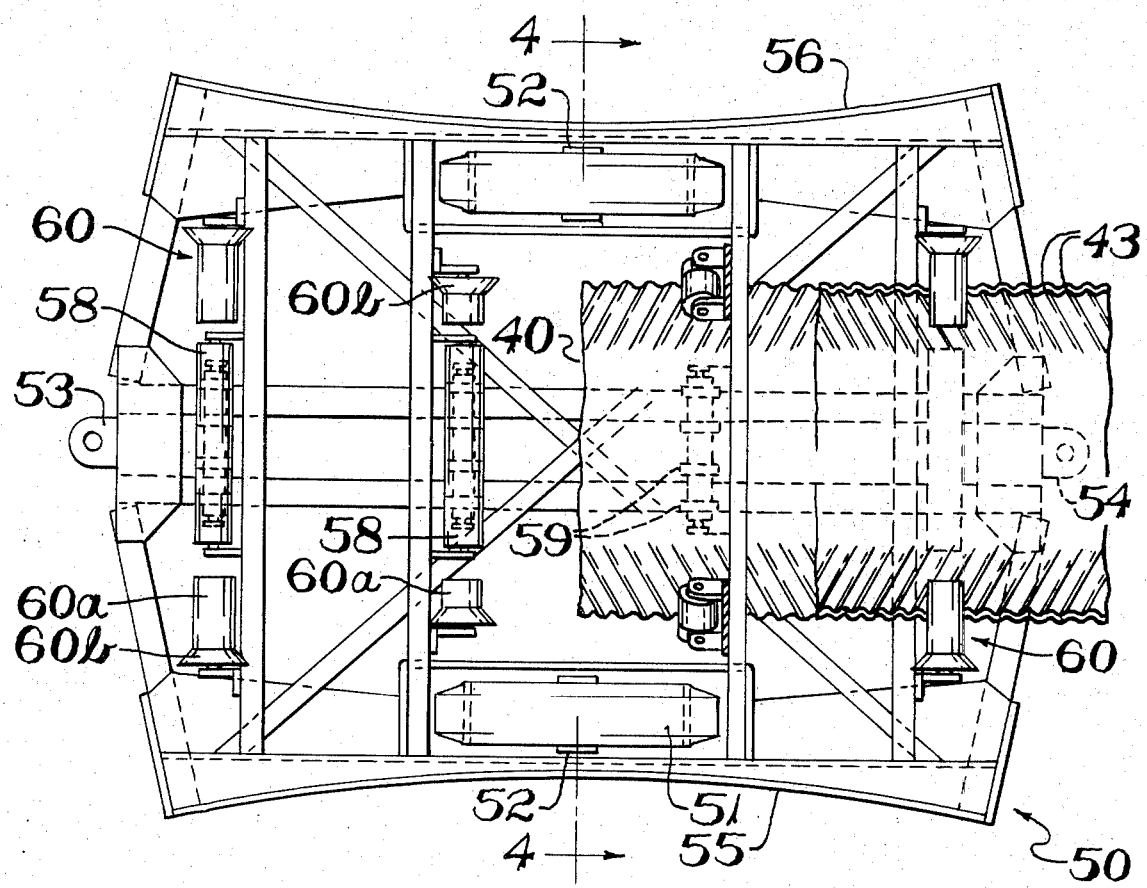
FIG. 2 is a plan view of one of the single axle carriages.
Figure 3:
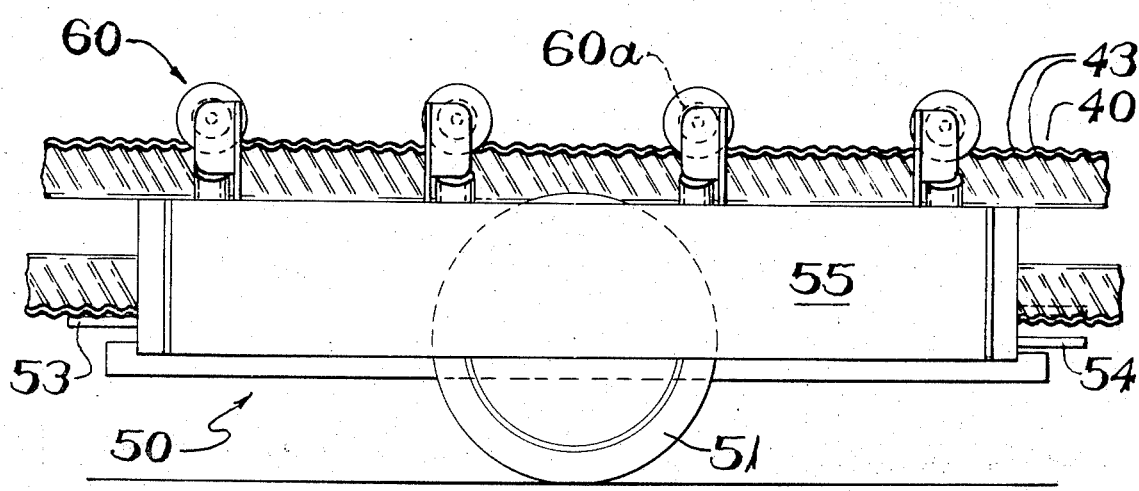
FIG. 3 is a side elevation view of the carriage of FIG. 2.

Referring now to FIGS. 2, 3 and 4, the preferred form of the conveyor belt is illustrated as comprising an inextensible but flexible central region or spine 41 embedded in elastomeric material 42 which is corrugated in a direction oblique to the spine on either side thereof to thus form the marginal regions of the belt. The corrugations 43 are illustrated as symmetrically oblique to the spine in a somewhat herring-bone fashion. However, it will be understood that the corrugations may also extend transversely perpendicular to the spine. In the presently preferred practice of the invention, the oblique corrugations are utilized to simplify requirements for providing idler rollers over which the belt is to be supported. The belt incorporated in the present invention is substantially that as set forth in my copending U.S. application Ser. No. 687,557 filed Dec. 4, 1967, now U.S. Pat. No. 3,545,598 and entitled "Laterally Flexible Belt Conveyor."

A plurality of portable belt supporting means in the form of carriages 50 is provided with each of the carriages pivotally interconnected in head-to-tail arrangement thus forming a chain of carriages. The carriages, as illustrated in FIGS. 2, 3 and 4, each have a single pair of transversely spaced supporting wheels 51 mounted so as to rotate about a centrally located axle 52 in transversely spaced arrangement. Pivotal connections 53 and 54 are provided respectively at each end of the carriage for interconnection to an adjacent carriage. The pivotal connections 53 and 54 may be of a pin-clevis type, or any other simple expedient, which permits flexing of the interconnection between the carriages in a plane parallel to the surface over which the carriage is traversed, with the pivotal interconnection being otherwise limited in flexibility. Each of the carriages has a bumper 55,56 mounted on each side thereof and extending longitudinally the length of the carriage, with each bumper exhibiting an outwardly concave surface in plan view. The bumpers 55,56 enable the carriage to make contact with the sides of roof supports or turning posts 57 provided in the galleries and move freely thereon and "track" or follow the tail tractor T around the corners of the mine pillars without the need for tracks or rails. Each of the carriages is maintained longitudinally balanced about the single axle by virtue of the pivotal hitch interconnection to the next adjacent carriage and the tension applied therebetween.

The end of each carriage is angled obliquely from the center such that each end of the carriage has a somewhat V-shape as illustrated in FIG. 2. The angled ends of adjacent carriages make contact when the train of carriages is curved about a sufficiently small radius. Thus, the angled ends of the carriages serve to limit the maximum amount of curvature between adjacent carriages.

Referring to FIG. 2, conveyor belt 40 is shown with the load carrying span thereof supported on a plurality of idler rollers 58. The rollers are each mounted so as to rotate freely about an axis transverse to the belt with the rollers being provided at spaced longitudinal stations along the carriage. In the presently preferred practice of the invention, the rollers are arranged with three rollers at each station with the center roller horizontally disposed and the outward rollers inclined at an angle thereto so as to conform to the troughed configuration of the conveyor belt as it passes over the pulleys 30 and rollers 58.

Referring now to FIG. 4, it will be seen that a similar arrangement of support rollers 59 is provided immediately beneath each station for the rollers 58, with the rollers 59 disposed so as to support the exterior periphery of the return span of the belt as it moved immediately beneath the load-carrying span. The rollers 59 are preferably arranged so as to restrain laterally the return span in an inverted direction or direction opposite that of the load-carrying span.

Referring to FIGS. 2, 3 and 4, additional retaining rollers 60 are provided at each idler station with the rollers 60 contacting the outer edges of the load carrying span of the belt to retain the belt in contact with the support rollers 58 yet permit roller contact during horizontal movement of the radially outer, or stretched, portion of the corrugations as the carriages negotiate transverse curves. The rollers as illustrated in FIG. 4 are preferably disposed so as to have a cylindrical portion 60a arranged to rotate about a horizontal axis and with a conically flanged portion 60b extending therefrom so as to contact the edge of the belt.

Referring now specifically to FIG. 5, an alternate form of the retaining rollers 70 is illustrated with a cylindrical portion 70a arranged to rotate about an axis inclined to the vertical such that the cylindrical portion of the rollers 70a contacts the outer edges of the belt. A conically flanged portion 70b is provided and extends at an obtuse angle from the cylindrical portion 70a with conical surface 70b contacting the corner formed by the belt edge with the load carrying surface of the belt. The roller arrangement of FIG. 5 thus permits the outer, or stretched, belt edge or move horizontally as the carriages follow the tractor in a curved path with edge corner contact of the conveyor belt being made with the conical portion of the rollers 70 instead of the entire edge surface of the belt contacting the conical portion of the roller as in the roller 60 of FIG. 4. The position of the belt corner as it contacts the conical surface 70b during curvature of the belt is illustrated in dashed line in FIG. 5 and in solid outline for belt corner contact during straight spans of the belt.

Referring now specifically to FIG. 6, an alternative arrangement is illustrated for the rollers supporting and retaining laterally the return span of the belt. The rollers 59' at each station are formed or attached in pairs with one roller 59' near each end of a common horizontal shaft S disposed transversely of the carriage. Each roller 59' has a flange 59'' conically tapered toward the centerline of the carriage with each longitudinal edge of the conveyor belt 40 making running contact with the respective adjacent conically tapered flange 59''. The shaft S is rotatably supported by a pair of bearing blocks B at each roller station transversely spaced on the carriage, preferably each equidistant from the centerline of the carriage and attached to the frame of the carriage. The alternate arrangement of rollers shown in FIG. 6 thus provides support and lateral restraint for the return span of the belt without the necessity of separate and/or obliquely disposed roller shafts.

In the preferred practice of the invention, the rollers 58, 59, 60 and 70 at the roller stations adjacent the ends of the carriage are spaced and/or extended transversely for a greater distance than the rollers provided at stations more centrally located on the carriage as is illustrated in FIG. 2. The wider spacing of the support rollers adjacent the carriage ends permits the belt 40 to assume a transversely somewhat arcuate configuration along the carriage and thus lessens the severity of the belt flexing between carriages.

When power is applied to pulley 30 on the head tractor causing the belt to move thereover, the load-carrying and return spans of the belt move longitudinally freely over the rollers on the carriages which serve to provide vertical support for the spans of the belt and horizontal restraint such that the belt follows the path of the carriages. The conveyor system is thus capable of continuously transporting the discharge from the automatic miner 20 through a transversely curved path around the pillars in mine galleries and discharging the material to a suitable remotely located collecting station. In the present practice, a transfer conveyor 80 (see FIG. 1) is mounted on the headend tractor H with the transfer conveyor arranged to discharge onto a stationary linear conveyor 90 which serves as a collector station. As the head-end tractor is pulled forward following the chain of mobile conveyor carriages the bulk material is discharged onto the conveyor 90 at a continuously changing location therealong.

Referring now to FIG. 7, the tail-end tractor T is illustrated with the belt 40 moving over the pulley means 30 with at least one station of idlers 58 and 59 provided on the tractor for supporting the spans of belt 40 in the region adjacent the pulley means 30. The pulley means 30 preferably comprises a drum having a corrugated surface (not shown) complementary to the belt surface; however, a smooth-surface cylindrical drum may be used for simplicity. The drum is rotatably mounted between a pair of transversely spaced brackets, or vertical plates 100, to rotate about a horizontal axis. The brackets 100 are slidably mounted on rails 101 affixed to the frame of the tractor such that the brackets or plates 100 may be moved longitudinally along the tractor for tensioning the belt. An adjustment means is provided illustrated in FIG. 7 as a fluid power cylinder 102 having the piston rod thereof pivotally connected to the brackets 100 with the opposite end of the cylinder anchored to the tractor frame by a pivotal connection to a lug 103 extending from the tractor frame. By energizing the power cylinder 102, the brackets 100 and drum 30 are moved along the tractor thus providing a means for tensioning the belt. A motor M with belt or chain drive (see FIG. 1a) is provided on the head-end tractor H, or discharge end, of the conveyor for powering the drum 30 over which the discharge end of the belt 40 passes. If desired, the head-end tractor H may be similar to the tail-end tractor as illustrated in FIG. 1a except that the drum 30 may be rotatably mounted at a fixed location on the head-end tractor H.

The conveyor system of the present invention thus employs a trackless train of pivotally interconnected single-axle carriages preferably having a tractor at either end for powering movement of the train in either direction along a transversely curved path. The elastomeric endless conveyor belt has an inextensible central spine embedded therein with the margins of the belt transversely corrugated to enable transverse flexing. The belt passes over drums provided on each tractor and is supported over each carriage by transverse troughing rollers provided thereon. The belt is moved over the drums by power means provided on one of the tractors while the entire train traverses the surface over which the bulk material is to be conveyed.

The present invention thus permits a miner discharge conveyor system to advance forward through the mine and eliminates separate relocation of transfer conveyor apparatus in order to continuously move the material from the miner to the stationary material collecting and dispatching station.

Modifications and adaptations of the illustrated embodiment will be apparent to those having ordinary skill in the art and the invention is limited only by the spirit and scope of the following claims.

I claim:

1. A mobile conveyor system for transporting bulk material in a path including both straight and transversely curved portions comprising:
   a. an endless flexible conveyor belt of reinforced elastomeric material with the said belt including an inextensible flexible central portion and spaced integral corrugated margins extending from the said central portion to the edges of the belt;
   b. a train of carriages each including belt-supporting idler means arranged to direct movement of the belt in troughed condition longitudinally of the carriage train and means individually supporting each carriage for movement over a surface to be traversed;
   c. said idler means including two rows of longitudinally spaced transversely extending rollers with one row contacting in a supporting manner the inner periphery of the load carrying span of said belt and the remaining row of rollers contacting in a supporting manner the outer periphery of the return span of said belt.
   d. tractor means connected to at least one end of said conveyor belt and carriage train including means for moving said tractor over the surface to be traversed;
   e. drive means connected to the discharge end of said belt for moving said belt over said idlers;
   f. means articulating said tractor means and said carriage train for movement as a unit in the direction of the length of said train while permitting angular displacement of the longitudinal centerline of any one of the said carriages relative to the other; and
   g. means limiting the extent of said angular displacement.

2. The system defined in claim 1, wherein
   a. said carriages are pivotally interconnected; and,
   b. said means for limiting the extent of said angular displacement includes interengageable surfaces on adjacent ends of said carriages with the included angle between corresponding surfaces of adjacent carriages and on a common side of the longitudinal centerline being less than a right angle.

3. The system as defined in claim 2, wherein the means individually supporting each of said carriages comprises a pair of spaced wheels mounted so as to rotate about a common transverse axis located equidistant between the ends of the carriage.

4. The system defined in claim 1, further comprising a separate tractor means at each end of said belt and train of carriages.

5. The system defined in claim 1, wherein each of said carriages has skid means provided on the sides thereof for permitting the carriage to move along a surface substantially perpendicular to the said surface to be traversed.

6. The system defined in claim 5, wherein said skid means includes rigid portions concavely curved about a vertical axis.

7. The system defined in claim 1, wherein each carriage has roller means contacting the edges and the outer periphery of the load carrying span of said belt for maintaining the belt in contact with said idler means during transverse curvature of the train of carriages.

8. The system defined in claim 7, wherein said roller means comprises a plurality of longitudinally spaced rollers disposed in two transversely spaced rows with the rollers in each row contacting respectively opposite transverse edges of the belt with each roller having a cylindrical portion and a flanged portion tapered conically and at an obtuse angle with said cylindrical portion.

* * * * *

UNITED STATES PATENT OFFICE
CERTIFICATE OF CORRECTION

Patent No. 3,701,411          Dated October 31, 1972

Inventor(s) HEBERT E. McGINNIS

It is certified that error appears in the above-identified patent and that said Letters Patent are hereby corrected as shown below:

The Inventor's first name should read ---HEBERT---.
Column, 4, line 4, delete "or" before "move" and insert ---to---.

Signed and sealed this 6th day of March 1973.

(SEAL)
Attest:

EDWARD M. FLETCHER, JR.
Attesting Officer

ROBERT GOTTSCHALK
Commissioner of Patents